(12) United States Patent
Honma (10) Patent No.: US 8,638,508 B2
(45) Date of Patent: Jan. 28, 2014

(54) LENS BARREL AND MANUFACTURING METHOD OF THE SAME

(75) Inventor: Jyunpei Honma, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/216,535

(22) Filed: Aug. 24, 2011

(65) Prior Publication Data

US 2012/0050894 A1    Mar. 1, 2012

(30) Foreign Application Priority Data

Aug. 30, 2010  (JP) ................................ 2010-191752

(51) Int. Cl.
*G02B 7/02*  (2006.01)
*G02B 15/14*  (2006.01)

(52) U.S. Cl.
USPC ............ 359/819; 359/694; 359/813; 359/829

(58) Field of Classification Search
USPC ................... 359/694–703, 811–830
See application file for complete search history.

(56) References Cited

U.S. PATENT DOCUMENTS

2001/0028513 A1 * 10/2001 Takanashi et al. ............ 359/703

FOREIGN PATENT DOCUMENTS

| JP | 11-174303 A | 7/1999 |
| JP | 2000-193869 A | 7/2000 |

* cited by examiner

*Primary Examiner* — Dawayne A Pinkney
(74) *Attorney, Agent, or Firm* — Rossi, Kimms & McDowell LLP (57) ABSTRACT

A lens barrel includes a holder configured to hold a lens, a fixing unit configured to fix the holder, an intermediate unit arranged between the fixing unit and the holder, a first fixing member configured to fix the intermediate unit and the holder, a second fixing member configured to fix the fixing unit and the intermediate unit, a first tilter configured to tilt an optical axis of the lens around a first straight line that is unparallel to the optical axis of the lens, by changing a tilt of the holder relative to the intermediate unit, and a second tilter configured to tilt the optical axis of the lens around a second straight line that is unparallel to the optical axis of the lens and the first straight line, by changing a tilt of the intermediate unit relative to the fixing unit.

11 Claims, 6 Drawing Sheets

LENS BARREL AND MANUFACTURING METHOD OF THE SAME

BACKGROUND OF THE INVENTION

1. Field of the Invention

The present invention relates to a lens barrel and a manufacturing method of the lens barrel.

2. Description of the Related Art

It is known to correct an optical axis shift (or align the optical axis) through a tilt correction that tilts an optical axis of a lens barrel. For example, Japanese Patent Laid-Open No. ("JP") 11-174303 discloses a lens barrel that uses as a fulcrum one of three arms provided to a lens holder, provides the other arms with screws each configured to change a distance from an attachment member of the lens barrel, and realizes a independent tilt correction of a lens by moving forward and backward each screw. Other prior art include JP 2000-193869.

However, according to JP 11-174303, a holding power is likely insufficient to the external force because fixations of the three arms lean over the center of gravity of the lens holder.

SUMMARY OF THE INVENTION

The present invention provides a lens barrel configured to be resistant to the external force and to provide a tilt correction.

A lens barrel according to the present invention includes a holder configured to hold a lens, a fixing unit configured to fix the holder, an intermediate unit arranged between the fixing unit and the holder, a first fixing member configured to fix the intermediate unit and the holder while maintaining a gap between the intermediate unit and the holder, a second fixing member configured to fix the fixing unit and the intermediate unit while maintaining a gap between the fixing unit and the intermediate unit, a first tilter configured to tilt an optical axis of the lens around a first straight line that is unparallel to the optical axis of the lens, by changing a tilt of the holder relative to the intermediate unit, and a second tilter configured to tilt the optical axis of the lens around a second straight line that is unparallel to the optical axis of the lens and the first straight line, by changing a tilt of the intermediate unit relative to the fixing unit.

Further features of the present invention will become apparent from the following description of exemplary embodiments with reference to the attached drawings.

DESCRIPTION OF THE EMBODIMENTS

Referring now to the accompanying drawings, a description will be given of a variety of embodiments of the present invention.

First Embodiment

Figure 1:
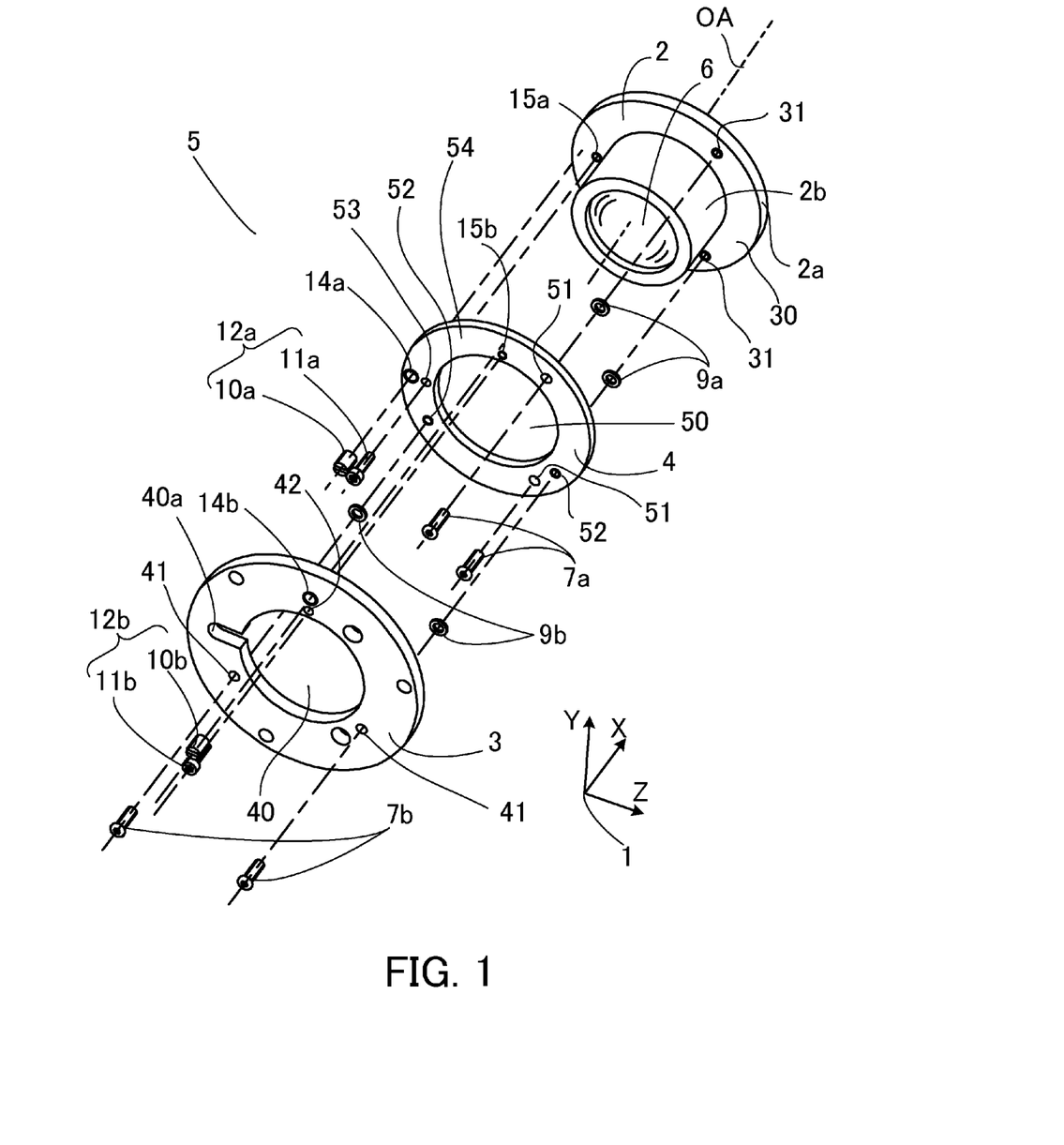
FIG. 1 is an exploded perspective view of a lens barrel according to a first embodiment.

FIG. 1 is an exploded perspective view of a lens barrel 5 according to this embodiment. The lens barrel 5 includes a lens holding frame (holder) 2, a fixing frame (fixing unit) 3, an intermediate ring (intermediate unit) 4, a pair of screws (first fixing members) 7a, a pair of screws (second fixing members) 7b, an adjusting screw unit (first tilter) 12a, and an adjusting screw unit (second tilter) 12b.

Figure 2A:
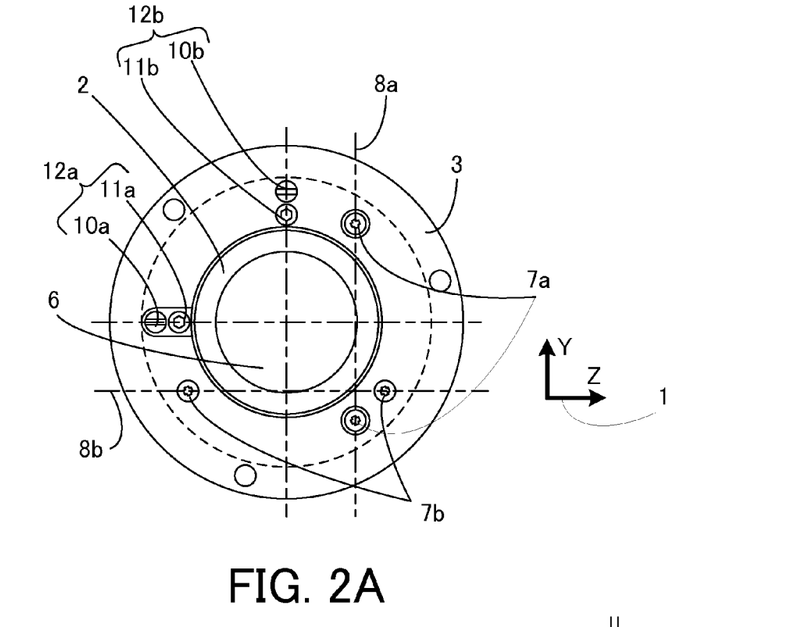
FIGS. 2A to 2C are plane and sectional views of the lens barrel illustrated in FIG. 1 according to the first embodiment.
Figure 2B:
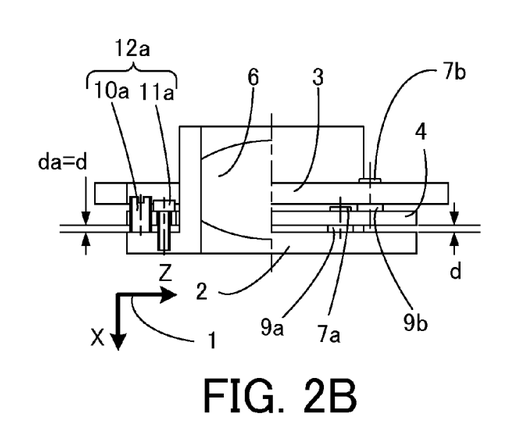
Figure 2C:
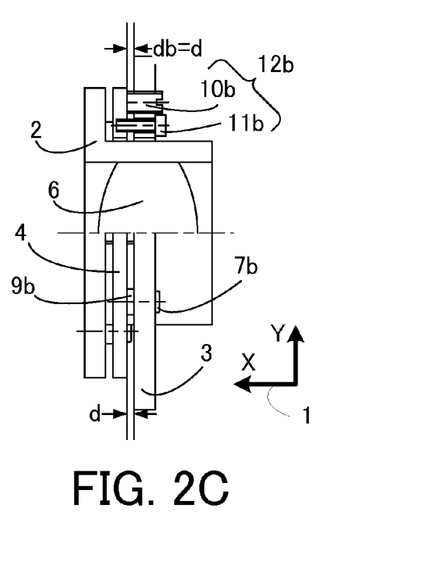

FIGS. 2A to 2C illustrate the assembled lens barrel 5. FIG. 2A is a plane view perpendicular to the optical axis of the lens 6 (or perpendicular to the centerlines of the screw 7a or 7b). FIGS. 2B and 2C are partially sectional views viewed from the bottom surface and the left side, respectively.

In each figure, reference numeral 1 denotes an orthogonal coordinate system. In the orthogonal coordinate system 1, an X-axis direction is an optical axis direction of the lens barrel (or a direction of an optical axis OA of the lens 6). A Y-axis direction and a Z-axis direction are two orthogonal directions on a plane orthogonal to the optical axis. In the Y-axis direction, positive is an upper side from the optical axis, and in the Z-axis direction, positive is a right side from the optical axis when viewed from the object side.

The lens holding frame 2 includes a hollow disc-shaped base 2a, and a hollow cylinder 2b configured to hold the lens 6. However, the shape of the base 2a is not limited to the disc shape, and a holding member of the lens 6 may have a polygonal shape rather than the cylindrical shape.

The base 2a has an annular surface 30 as a front surface that is orthogonal to a straight line parallel to the centerline of the cylinder 2b (or the optical axis direction of the lens 6 or the X-axis direction). Via the annular surface 30, the lens holding frame 2 is fixed onto the fixing frame 3 and the intermediate ring 4, but this surface does not have to be orthogonal to the optical axis direction of the lens 6 or may be unparallel. The fixed surface parallel to the optical axis direction of the lens 6, causing the lens barrel to be larger. Thus, the nonparallel configuration as in this embodiment is suitable.

The base 2a is coupled with one end of the cylinder 2b, and has a pair of screw holes 31 each equally distant from an arbitrary position on the optical axis of the lens 6. In other words, when the annular surface 30 is viewed from a direction perpendicular to the annular surface 30, the centers of the pair of screw holes 31 are equally distant from the center of the internal or external surface of the annular surface 30.

The lens holding frame 2 further includes a (third) screw hole 15a corresponding to an drawing screw 11a, which will be described later.

The fixing frame 3 has a flat shape, and is configured to fix the annular surface 30 of the base 2a of the lens holding frame 2, which is not parallel to (almost orthogonal to) the optical axis of the lens 6. The flat shape of the fixing frame 3 is a disc plate shape in this embodiment, and has a central through-hole 40 into which the cylinder 2b of the lens holding frame 2 is inserted, and a pair of through-holes 41 each equally distant an arbitrary position on the centerline of the through-hole 40. The through-hole 40 is connected to an elongated hole 40a in which the adjusting screw unit 12a is inserted.

There is a sufficient gap between the through-hole 40 and the cylinder 2b so that they do not interfere with each other at the tilting time. When the fixing frame 3 is viewed from the direction of the centerline of the through-hole 40 (or –X direction), the centers of the pair of through-holes 41 are equally distant from the center of the through-hole 40. The fixing frame 3 is fixed onto another lens holding frame (not illustrated) of the lens barrel 5. The other lens holding frame (not illustrated) and an image pickup element are arranged so that the lens barrel 5 can be optically connected with the fixing frame 3, and the optical performance of the entire lens barrel is adjustable by the tilting.

The fixing frame 3 further has a through-hole 42 and a threaded through-hole 14b.

The intermediate ring 4 is provided between the fixing frame 3 and the annular surface 30 of the base 2a of the lens holding frame 2, and has a disc shape in this embodiment. The intermediate ring 4 has a central through-hole 50, into which the cylinder 2b of the lens holding frame 2 is inserted. There is a sufficient gap between the through-hole 50 and the cylinder 2b so that they do not interfere with each other at the tilting time.

The intermediate ring 4 includes a pair of through-holes 51 each equally distant from an arbitrary position on the centerline of the through-hole 50, and a pair of screw holes 52 each equally distant from an arbitrary position on the centerline of the through-hole 50. When the intermediate ring 4 is viewed from the centerline of the through-hole 50 (the –X direction), the centers of the pair of through-holes 51 are equally distant from and the centers of the pair of through-holes 52 are equally distant from the center of the through-hole 50.

The intermediate ring 4 further has a through-hole 53 corresponding to the drawing screw 11a, a threaded through-hole 14a corresponding to the pushing screw 10, and a screw hole 15b corresponding to the drawing screw 11b.

The annular surface 30 of the base 2a of the lens holding frame 2 and the intermediate ring 4 are fixed by a pair of coupling screws (first screws) 7a at two positions on a straight line 8a in the Y-axis direction in the orthogonal coordinate system 1. A pair of spacers 9a is provided at fixing positions of the coupling screws 7a between the base 2a of the lens holding frame 2 and the intermediate ring 4. Thereby, the lens holding frame 2 is spaced from the intermediate ring 4 by a gap corresponding to a thickness "d" of the spacer 9a at a position other than the coupling positions.

Means for fixing the annular surface 30 of the base 2a of the lens holding frame 2 and the intermediate ring 4 is not limited to the pair of screws 7a, but may use another fixing means, such as a U-shaped fixture, bond, or weld.

The fixing frame 3 and the intermediate ring 4 are fixed by a pair of connecting screws (second screws) 7b via a pair of spacers 9b at two positions on the straight line 8b in the Z-axis direction in the orthogonal coordinate system 1. Thereby, the fixing frame 3 is spaced from the intermediate ring 4 by a gap corresponding to a thickness "d" of the spacer 9b at a position other than the coupling positions by the coupling screws 7b.

Means for fixing the fixing frame 3 and the intermediate ring 4 is not limited to the pair of screws 7b, but may use another fixing means, such as a U-shaped fixture, bond, or weld.

While this embodiment sets the thicknesses of the spacers 9b and 9a equal to each other, they may be different as long as each thickness is enough for tilting.

The adjusting screw unit 12a tilts the optical axis OA of the lens 6 around the (first) straight line 8a illustrated in FIG. 2A by changing a gap between the intermediate ring 4 and the base 2a of the lens holding frame 2 (or by changing an tilt of the lens holding frame 2 to the intermediate ring 4). The straight line 8a is formed by connecting the centers of the pair of through-holes 51 (or the centers of the pair of screw holes 31 or the centers of the screws 7a). The center of the screw 7a is an intersection between a virtual center axis perforating the screw 7a in the longitudinal direction and a virtual plane that halves the thickness of the base 2a of the lens holding frame 2 or the intermediate ring 4. However, a straight line other than the straight line 8a made by connecting the centers of the pair of through-holes 51 may be used depending upon a configuration of fixing means for fixing the lens holding frame 2 and the intermediate ring 4. In that case, that straight line may, but need not to, crosses the intermediate ring 4. The straight line 8a in this embodiment is a tangent or crosses outside of the lens 6, but may cross the inside of the lens 6. In comparison with the straight line 8a crossing the inside of the lens 6, the straight line 8a crossing the outside of the lens 6 can reduce a tilt variation amount of the lens holding frame 2 by the adjusting screw unit 12a and facilitates fine adjustments.

The adjusting screw unit 12a includes, as illustrated in FIG. 2A, the pushing screw 10a and the drawing screw 11a that are aligned with a line intersecting the optical axis and parallel to the Z-axis perpendicular to the straight line 8a. The pushing screw 10a is a (second) screw, which is inserted into the through-hole 14a and configured to compress the annular surface 30 of the lens holding frame 2. The drawing screw 11a is a (first) screw engageable with the screw hole 15a via the through-hole 53.

Figure 3A:
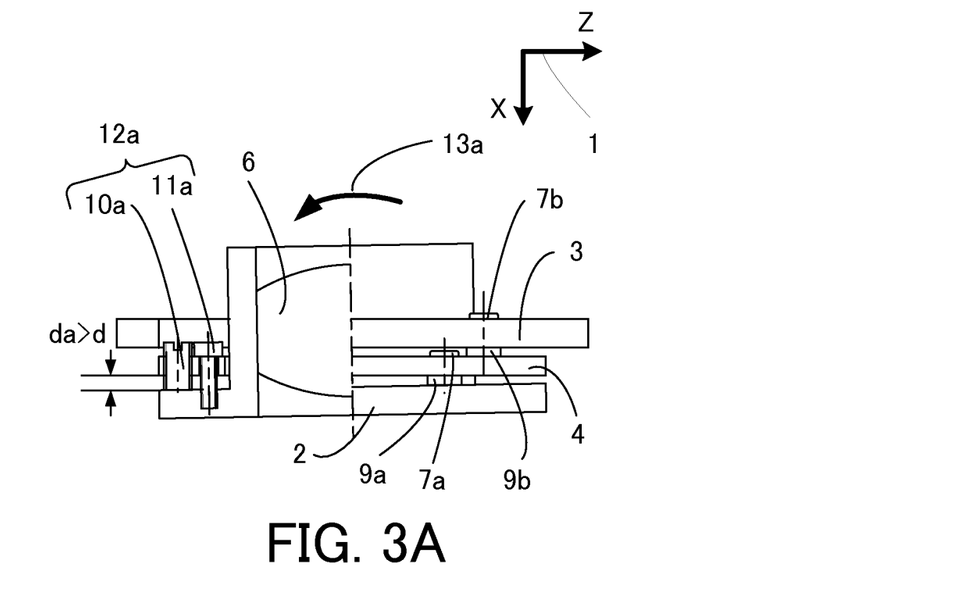
FIGS. 3A and 3B are sectional views for explaining tilting between an intermediate ring and a lens holding frame illustrated in FIG. 1 according to the first embodiment.
Figure 3B:
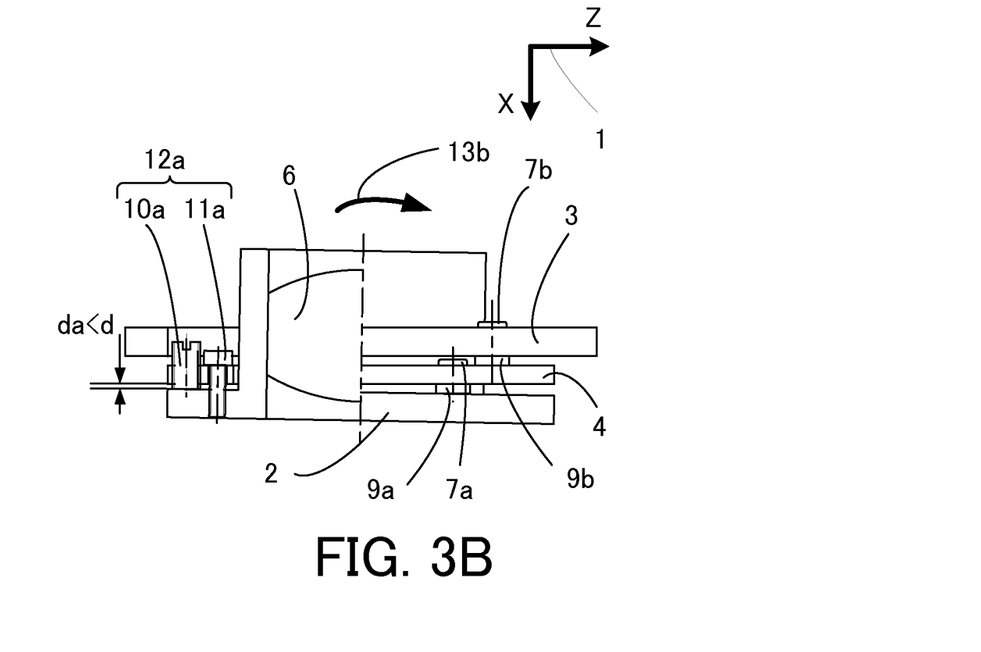

Referring now to FIGS. 2B and 3, a description will be given of a tilting method using the pushing screw 10a and drawing screw 11a and performed between the lens holding frame 2 and the intermediate ring 4.

FIGS. 3A and 3B illustrate tilting between the lens holding frame 2 and the intermediate ring 4. FIG. 3A is a partially sectional view of tilting in a rotating direction designated by an arrow 13a around the Y-axis, and FIG. 3B is a partially sectional view of tilting in a rotating direction designated by an arrow 13b around the Y-axis.

Before tilting is initiated, the drawing screw 11a and the pushing screw 10a are loosened to have margins enough for the adjustment amounts. FIG. 2B illustrates this state. At the coupling positions, the constant gap between the intermediate ring 4 and the lens holding frame 2 are maintained by the spacers 9a. In addition, a gap "da" between the intermediate ring 4 and the lens holding frame 2 near the adjusting screw unit 12a is almost equal to the thickness d of the spacer.

Referring now to FIG. 3A, a description will be given of tilting in the arrow 13a direction around the Y-axis. As described above, the pushing screw 10a is inserted into the through-hole 14a provided in the intermediate ring 4, and configured to compress the annular surface 30 of the lens holding frame 2. Hence, as the pushing screw 10a is fastened, the lens holding frame 2 is pressed, and the gap "da" between the intermediate ring 4 and the lens holding frame 2 near the adjusting screw unit 12a becomes larger than the thickness "d" of the spacer 9a.

The gap between the lens holding frame 2 and the intermediate ring 4 is different between the coupling position and the pushing screw 10a, and the lens holding frame 2 can be tilted to the intermediate ring 4 around the straight line 8a as an axis. A tilt amount of the lens holding frame 2 is adjustable by controlling the gap difference.

Tilting in the opposite direction utilizes the drawing screw 11a. A description will be given of this tilting with reference to FIG. 3B. The screw hole 15a corresponding to the drawing screw 11a is provided into the lens holding frame 2. Hence, as the drawing screw 11a is fastened, the gap "da" between the intermediate ring 4 and the lens holding frame 2 near the adjusting screw unit 12a becomes smaller than the thickness "d" of the spacer 9a.

Similar to use of the pushing screw 10a, the gap between the intermediate ring 4 and the lens holding frame 2 is different between the coupling position and the drawing screw 11a, and the lens holding frame 2 is tilted to the intermediate ring 4.

As discussed, switching the adjusting screw depending upon the tilt direction of the lens holding frame 2 can provide tilting around the straight line 8a as the axis.

Figure 4A:
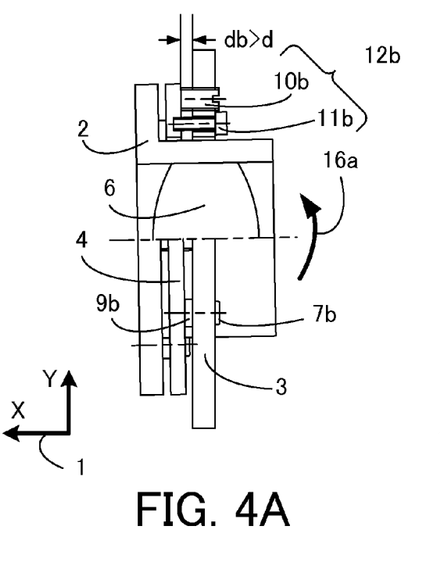
FIGS. 4A and 4B are sectional views for explaining tilting between a fixing frame and the intermediate ring illustrated in FIG. 1 according to the first embodiment.
Figure 4B:
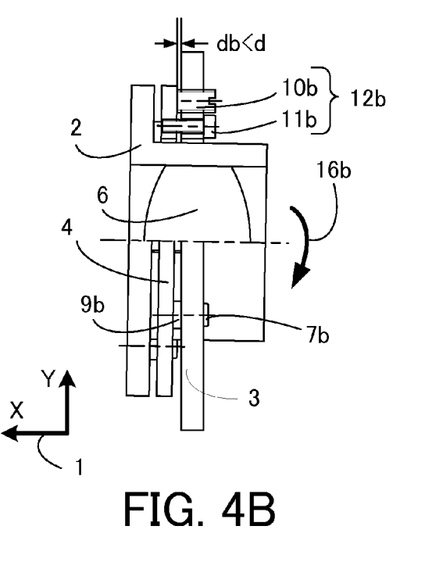

Tilting between the fixing frame 3 and the intermediate ring 4 utilizes a configuration similar to that between the intermediate ring 4 and the lens holding frame 2. A description will be given of this tilting with reference to FIGS. 2C, 4A, and 4B. FIGS. 4A and 4B illustrate tilting between the fixing frame 3 and the intermediate ring 4. FIG. 4A is a partially sectional view of tilting in a rotating direction designated by an arrow 16a around the Z-axis. FIG. 4B is a partially sectional view of tilting in a rotating direction designated by an arrow 16b around the Z-axis.

As illustrated in FIG. 2A, the adjusting screw unit 12b tilts the optical axis of the lens 6 around a (second) straight line 8b that is unparallel to the straight line 8a by changing the gap between the fixing frame 3 and the intermediate ring 4 (or by changing a tilt of the intermediate ring 4 relative to the fixing frame 3). The straight line 8b is formed by connecting the centers of the pair of through-holes 41 (or the centers of the pair of screw holes 52 or the centers of the screws 7b. The center of the screw 7b is an intersection between a virtual center axis perforating the screw 7b in the longitudinal direction and a virtual plane that halves the thickness of the fixing frame 3 or the intermediate ring 4. However, a straight line other than the straight line 8b made by connecting the centers of the pair of through-holes 41 may be used depending upon a configuration of fixing means for fixing the fixing frame 3 and the intermediate ring 4. In that case, that straight line may, but need not to, cross the fixing frame 3. The straight line 8b in this embodiment is a tangent or crosses the outside of the lens 6, but may cross the inside of the lens 6. In comparison with the straight line 8b crossing the inside of the lens 6, the straight line 8b crossing the outside of the lens 6 can reduce a tilt variation amount of the intermediate ring 4 by the adjusting screw unit 12b and facilitates fine adjustments.

The straight lines 8a and 8b are unparallel to the optical axis, and unparallel to each other. The straight lines 8a and 8b do not have to cross the screw or screw hole, but both may be contained in the plane perpendicular to the optical axis.

The adjusting screw unit 12b includes, as illustrated in FIG. 2A, the pushing screw 10b and the drawing screw 11b that are aligned with a line intersecting the optical axis and parallel to the Z-axis perpendicular to the straight line 8b. The pushing screw 10b is a (fourth) screw, which is inserted into the through-hole 14b and configured to compress a surface 54 of the intermediate ring 4. The drawing screw 11b is a (third) screw engageable with the screw hole 15b via the through-hole 42.

The adjustment at this time is similar to that for the fixing frame 3 and the intermediate ring 4. In other words, before tilting is initiated, the drawing screw 11b and the pushing screw 10b are loosened to have margins enough for the adjustment amounts. FIG. 2C illustrates this state. Thereafter, tilting around the straight line 8b as an axis can be realized by widening a gap "db" between the intermediate ring 4 and the fixing frame 3 at the adjusting screw unit 12b using the pushing screw 10b or by narrowing the gap "db" using the drawing screw 11b.

The above configuration can provide independent, two-directional tilting around the straight lines 8a and 8b as axes. Since the straight lines 8a and 8b are orthogonal to each other (or since projected straight lines made by projecting the straight lines 8a and 8b onto the virtual plane orthogonal to the optical axis are orthogonal to each other), tilting in an arbitrary direction can be easily performed by combining these longitudinal and lateral tilts.

According to this embodiment, the screws 7a fix the lens holding frame 2 and the intermediate ring 4, the screws 7b fix the fixing frame 3 and the intermediate ring 4, and the straight line 8a with which a pair of screws 7a is aligned has a different phase from that of the straight line 8b with which a pair of screws 7b is aligned. The lens 6 is tilted by the adjusting screw unit 12a apart from the screws 7a or the straight line 8a and the adjusting screw unit 12b apart from the screws 7b or the straight line 8b. Since the lens 6 is thus fixed at six fixing members, the lens barrel 5 can provide tilting while it is maintained resistant to the external force.

After tilting ends, one or two of the pushing screws 10a, 10b, and the drawing screws 11a, 11b, which are not used for the tilting are fastened. Thereby, the lens 6 can be fixed while its tilt state is maintained. Three fixations around the center axis of the lens holding frame 2 can securely maintain the tilt state.

Figure 5:
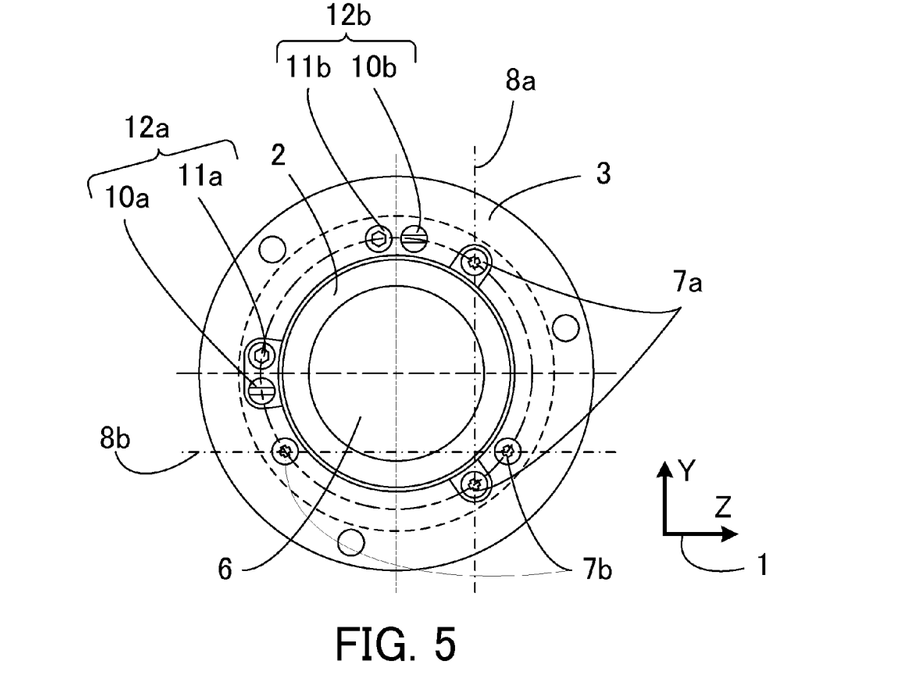
FIG. 5 is a plane view of a variation of FIG. 2A according to the first embodiment.

If the pushing screws 10a, 10b and the drawing screws 11a, 11b are not arranged on the corresponding straight lines 8a, 8b, an unintentional force may occur in fixing the non-used adjusting screws and the lens holding frame 2 may fall in an unintentional direction. If this influence is unlikely problematic, the pushing screws 10a, 10b and the drawing screws 11a, 11b may be arranged parallel to the straight lines 8a, 8b, as illustrated in FIG. 5. This arrangement can reduce the size of the lens barrel 5 in the diameter direction.

Figure 6:
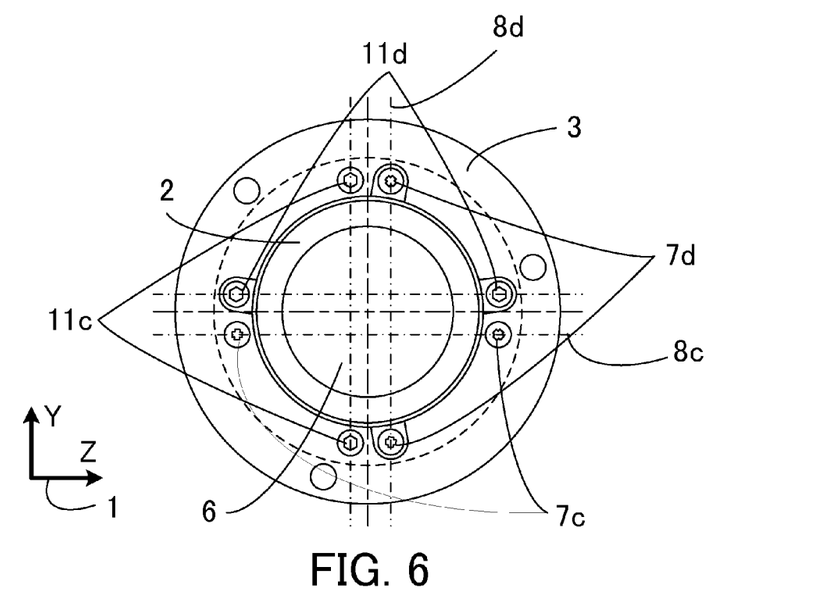
FIG. 6 is a plane view of another variation of FIG. 2A according to the first embodiment.

Alternatively, as illustrated in FIG. 6, each pair of adjusting screws 11c, 11d may be arranged across a corresponding one of straight lines 8c, 8d at two positions so that the straight lines 8c, 8d that are made by connecting arrangement positions of coupling screws 7c, 7d can be closer to the optical axis center. Each pair of adjusting screws 11c, 11d in each axial direction includes drawing screws, and provides tilting by differentiating drawing amounts between both sides. Each pair of adjusting screws may be pushing screws to widen the gap between both sides and to adjust a pushing amount for tilting.

While this embodiment separates a tilt direction into the longitudinal direction and the lateral direction, the separating direction is not limited to this embodiment as long as two straight lines have different phases. In addition, while this embodiment minimizes a tilting width in an arbitrary direction by using two orthogonal separating directions. An orthogonal arrangement is not necessarily required as long as an adjusting amount necessary for tilting is secured.

This embodiment utilizes screw pushing and drawing to widen and narrow the gap at the adjusting portion in tilting between the fixing frame and the intermediate ring or between the intermediate ring and the lens holding frame, but may use another method, such as adjusting the gap by inserting a wedge-shaped component in the gap and by adjusting the insertion amount.

This embodiment utilizes the fixing frame to couple the lens barrel with the adjacent lens holding frame etc., but the fixing frame itself may be serve as a holding frame of the image pickup element or a lens adjacent to the lens to be tilted or mount of the lens barrel.

This embodiment provides the spacers at the coupling positions to space the intermediate ring from the fixing frame, and the intermediate ring from the fixing frame, but a projection that serves as the spacer may be provided onto the intermediate ring, the lens holding frame, or the fixing frame.

This embodiment also discloses a manufacturing method of the above lens barrel. This manufacturing method includes a step of tilting the optical axis OA of the lens 6 around the straight line 8a by changing a gap between the intermediate ring 4 and the base 2a, and a step of tilting the optical axis OA of the lens 6 around the straight line 8b by changing a gap between the fixing frame 3 and the intermediate ring 4.

Second Embodiment

Referring now to FIGS. 7A to 10B, a description will be given of a lens barrel according to a second embodiment. A description of a structure of this embodiment similar to that of the first embodiment will be omitted. The lens barrel of this embodiment includes an intermediate ring 21 instead of the intermediate ring 4. The intermediate ring 21 includes a tilted plane that is unparallel and tilts to a plane orthogonal to a centerline of a center through-hole on at least one of a plane opposite to the lens holding frame 2 and a plane opposite to the fixing frame 3.

FIGS. 7A to 9B are side views illustrating part or whole of the lens barrel for tilting utilizing the intermediate ring 21 having a constant tilt angle θ on the front side and the backside with a phase shift of 90°.

Figures 7A, 7B:
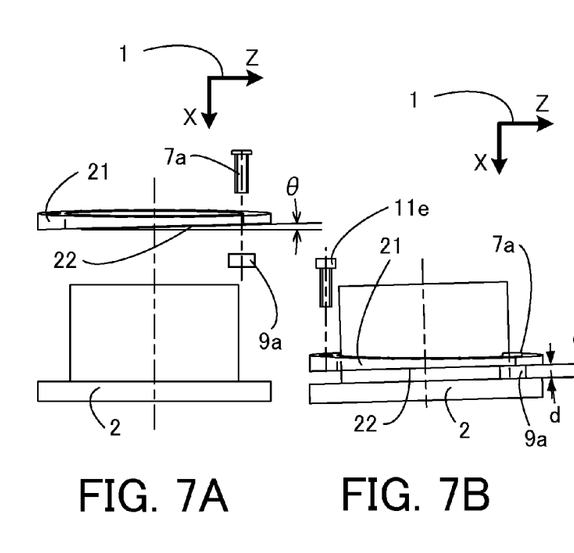
FIGS. 7A to 7C are side views for explaining tilting between an intermediate ring and a lens holding frame according to a second embodiment.
Figure 7C:
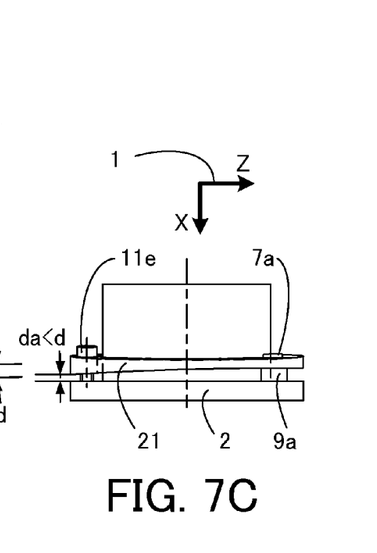

FIGS. 7A to 7C are views for explaining an assembly between the intermediate ring 21 and the lens holding frame 2. FIG. 7A is a side view of a pre-assembly state, FIG. 7B is a side view of a fixing state by the coupling screws 7a, and FIG. 7C is a side view in which the lens holding frame 2 is drawn by the adjusting screw 11e from the state illustrated in FIG. 7B.

An attachment plane of the intermediate ring 21 to the lens holding frame 2 is a tilted plane 22, as illustrated in FIGS. 7A to 7C, in which a gap between the intermediate ring 21 and the lens holding frame 2 increases from the adjusting screw 11e to the fixing screws 7a. Thereby, when the lens holding frame 2 and the intermediate ring 21 are fixed by the coupling screws 7a, the lens holding frame 2 is tilted along the tilted plane 22 and fixed, as illustrated in FIG. 7B.

As the drawing screw 11e for tilting is fastened, the gap "da" between the intermediate ring 21 and the lens holding frame 2 narrows at the drawing screw 11e, and the original tilt amount is reduced. Thereby, as illustrated in FIG. 7C, a tilt amount caused by the influence of the tilted plane 22 of the intermediate ring 21 is recovered. When the drawing screw 11e is further fastened, a tilt opposite to the original tilt direction is available.

Figure 8A:
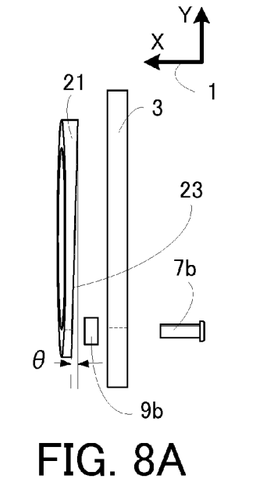
FIGS. 8A to 8C are sectional views for explaining tilting between a fixing frame and the intermediate ring illustrated in FIGS. 7A to 7C according to the second embodiment.
Figure 8B:
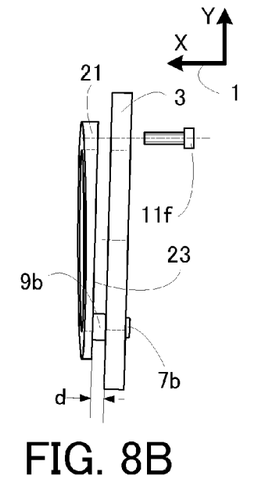
Figure 8C:
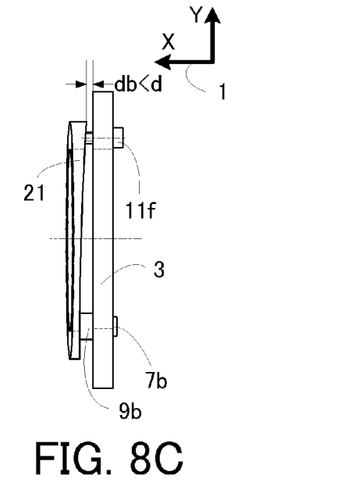

FIG. 8A to 8C are views for explaining an assembly between the fixing frame 3 and the intermediate ring 21. FIG. 8A is a side view of a pre-assembly state, FIG. 8B is a side view of a fixing state by the coupling screws 7b, and FIG. 8C is a side view in which the lens holding frame 2 is drawn by the adjusting screw 11f from the state illustrated in FIG. 8B.

The intermediate ring 21 has a tilted plane 23 on the attachment plane to the fixing frame 3, which shifts a phase by 90° from the tilted plane 22 on the attachment plane to the lens holding frame 2. Thus, when the fixing frame 3 is coupled with the intermediate ring 21, the intermediate ring 21 and the fixing frame 3 tilt in the direction having a phase shift of 90° from a tilt direction of the intermediate ring 21 and the fixing frame 3.

An adjustment from this state is similar to that for the lens holding frame 2 and the intermediate ring 21. In other words, by fastening the drawing screw 11f from the tilted state, a tilt amount can be gradually reduced. As the drawing screw 11f is further fastened, the tilt opposite to the original tilt direction is available.

Figure 9A:
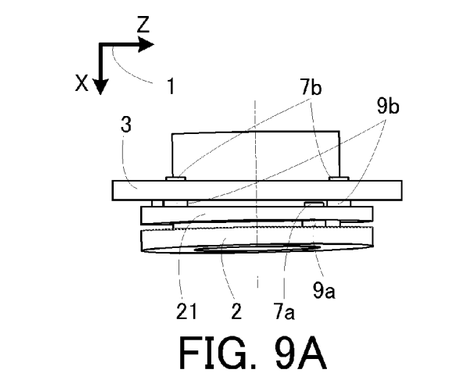
FIGS. 9A and 9B are side views of a lens barrel illustrated in FIGS. 7A to 7C according to the second embodiment.
Figure 9B:
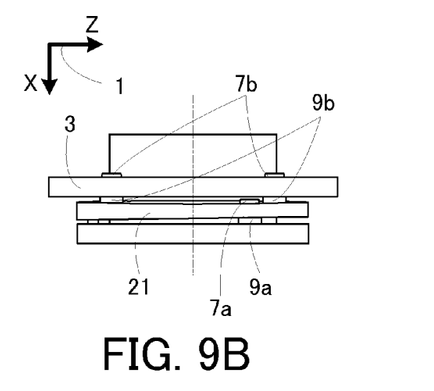

FIGS. 9A and 9B illustrate an assembled state from the fixing frame 3 to the lens holding frame 2. FIG. 9A illustrates a pre-tilting state, and FIG. 9B illustrates a tilted state in which the optical axis of the lens 6 accords with the X-axis direction in the coordinate system 1.

The intermediate ring 21 has the tilted planes on the front side and the backside with a phase shift, and provide coupling with tilts in both the longitudinal and lateral directions. The optical axis center of the lens 6 can be tilted relative to the attachment plane to the fixing frame 3 in the opposite direction by adjusting the fastening amounts of the drawing screws 11e and 11f.

Thus, tilting from a state of a constant tilt amount can be provided only by adjusting a fastening amount of the drawing screw for each separated tilt direction.

Figure 10A:
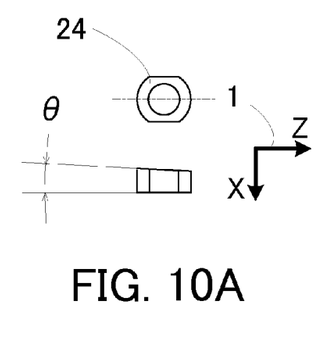
FIGS. 10A and 10B are plane and side views of a variation of FIGS. 7A to 7C according to the second embodiment.
Figure 10B:
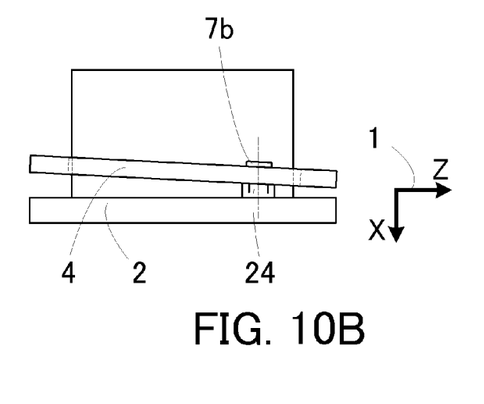

A method for previously tilting and fixing the lens holding frame is not limited to a method using the intermediate ring 21 having tilted planes. For example, as illustrated in FIGS. 10A and 10B, the spacer 24 may have a tilted plane of a constant angle and tilt each pair of the lens holding frame 2 and the intermediate ring 4, and the intermediate ring 4 and the fixing frame 3.

In this example, as a mark to align the two spacers 24, the spacer 24 has a pair of parallel bevels at an outer circumferential part. When the intermediate ring 4 and the lens holding frame 2 have grooves corresponding to the bevel, it becomes easier to align the tilt directions of the two spacers 24.

This embodiment places two spacers having two tilt planes at the two positions of the coupling screws and uses them while according their tilt directions with each other, but may use one spacer made by coupling two spacers. Thereby, no alignment of the spacers is necessary and the tilt direction can be set only by placing the spacer.

Alternatively, two spacers aligned with the straight line may have different heights. This method changes the heights of the two spacers aligned with an axis in a first direction to provide a tilt in a second direction, and changes the heights of the two spacers aligned with an axis in the second direction to provide a tilt in the first direction.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-191752, filed Aug. 30, 2010, which is hereby incorporated by reference herein in its entirety.

What is claimed is:
1. A lens barrel comprising:
a holder configured to hold a lens;
a fixing unit configured to fix the holder;

an intermediate unit arranged along an optical axis between the fixing unit and the holder so as to overlap the fixing unit and the holder in an optical axis direction of the lens;

a first fixing member configured to fix the intermediate unit and the holder arranged so as to overlap the fixing unit and the holder in the optical axis direction, while maintaining a gap between the intermediate unit and the holder along the optical axis;

a second fixing member configured to fix the fixing unit and the intermediate unit arranged so as to overlap the fixing unit and the holder in the optical axis direction, while maintaining a gap between the fixing unit and the intermediate unit along the optical axis;

a first tilter configured to tilt an optical axis of the lens around a first straight line that is unparallel to the optical axis of the lens, by changing a tilt of the holder relative to the intermediate unit; and a second tilter configured to tilt the optical axis of the lens around a second straight line that is unparallel to the optical axis of the lens and the first straight line, by changing a tilt of the intermediate unit relative to the fixing unit, wherein the first tilter includes a first screw which perforates the intermediate unit and is engaged with the holder, and a second screw which perforates the intermediate unit and is configured to compress a surface of the holder, wherein the second tilter includes a third screw which perforates the fixing unit and is engaged with the intermediate unit, and a fourth screw which perforates the fixing unit and is configured to compress a surface the intermediate unit, wherein the first screw and the third screw are drawing screws, and the second screw and the fourth screw are pushing screws, wherein the tilt of the holder relative to the intermediate unit is changed to a first direction by fastening the first screw and is changed to a direction opposite to the first direction by fastening the second screw, and wherein the tilt of the intermediate unit to the fixing unit is changed to a second direction by fastening the third screw and is changed to a direction opposite to the second direction by fastening the fourth screw.

2. The lens barrel according to claim 1, wherein:
the first straight line crosses the intermediate unit, and
the second straight line crosses the fixing unit.

3. The lens barrel according to claim 1, wherein:
the first straight line is a straight line made by connecting centers of a pair of the first fixing members on a plane orthogonal to centerlines of the first fixing members, and
the second straight line is a straight line made by connecting centers of a pair of the second fixing members on a plane orthogonal to centerlines of the second fixing members.

4. The lens barrel according to claim 1, wherein a first projection line made by projecting the first straight line onto a virtual plane that is orthogonal to the optical axis is orthogonal on the virtual plane to a second projection line made by projecting the second straight line onto the virtual plane.

5. The lens barrel according to claim 1, wherein the intermediate unit includes a tilted plane relative to a plane orthogonal to the optical axis on at least one of a plane opposite to the holder and a plane opposite to the fixing unit.

6. A manufacturing method of a lens barrel, the lens barrel comprising:
a holder configured to hold a lens;

a fixing unit configured to fix the holder;

an intermediate unit arranged along an optical axis between the fixing unit and the holder so as to overlap the fixing unit and the holder in an optical axis direction of the lens;

a first fixing member configured to fix the intermediate unit and the holder arranged so as to overlap the fixing unit and the holder in the optical axis direction, while maintaining a gap between the intermediate unit and the holder along the optical axis;

a second fixing member configured to fix the fixing unit and the intermediate unit arranged so as to overlap the fixing unit and the holder in the optical axis direction, while maintaining a gap between the fixing unit and the intermediate unit along the optical axis;

a first tilter configured to tilt an optical axis of the lens around a first straight line that is unparallel to the optical axis of the lens, by changing a tilt of the holder relative to the intermediate unit; and a second tilter configured to tilt the optical axis of the lens around a second straight line that is unparallel to the optical axis of the lens and the first straight line, by changing a tilt of the intermediate unit relative to the fixing unit, wherein the first tilter includes a first screw which perforates the intermediate unit and is engaged with the holder, and a second screw which perforates the intermediate unit and is configured to compress a surface of the holder, wherein the second tilter includes a third screw which perforates the fixing unit and is engaged with the intermediate unit, and a fourth screw which perforates the fixing unit and is configured to compress a surface the intermediate unit, wherein the first screw and the third screw are drawing screws, and the second screw and the fourth screw are pushing screws, wherein the manufacturing method of the lens barrel comprises the steps of:

tilting an optical axis of the lens around a first straight line that is unparallel to the optical axis of the lens, by changing a tilt of the holder relative to the intermediate unit by fastening at least one of the first screw of the second screw; and tilting the optical axis of the lens around a second straight line that is unparallel to the optical axis of the lens and the first straight line, by changing a tilt of the intermediate unit relative to the fixing unit by fastening at least one of the third screw or the fourth screw.

7. An image pickup apparatus comprising:
a lens; and
a lens barrel holding the lens,
wherein the lens barrel includes:
a holder configured to hold the lens;
a fixing unit configured to fix the holder;
an intermediate unit arranged along an optical axis between the fixing unit and the holder so as to overlap the fixing unit and the holder in an optical axis direction of the lens;

a first fixing member configured to fix the intermediate unit and the holder arranged so as to overlap the fixing unit and the holder in the optical axis direction, while maintaining a gap between the intermediate unit and the holder along the optical axis;

a second fixing member configured to fix the fixing unit and the intermediate unit arranged so as to overlap the fixing unit and the holder in the optical axis direction, while maintaining a gap between the fixing unit and the intermediate unit along the optical axis;

a first tilter configured to tilt an optical axis of the lens around a first straight line that is unparallel to the optical axis of the lens, by changing a tilt of the holder relative to the intermediate unit; and a second tilter configured to tilt the optical axis of the lens around a second straight line that is unparallel to the optical axis of the lens and the first straight line, by changing a tilt of the intermediate unit relative to the fixing unit, wherein the first tilter includes a first screw which perforates the intermediate unit and is engaged with the holder, and a second screw which perforates the intermediate unit and is configured to compress a surface of the holder, wherein the second tilter includes a third screw which perforates the fixing unit and is engaged with the intermediate unit, and a fourth screw which perforates the fixing unit and is configured to compress a surface the intermediate unit, wherein the first screw and the third screw are drawing screws, and the second screw and the fourth screw are pushing screws, wherein the tilt of the holder relative to the intermediate unit is changed to a first direction by fastening the first screw and is changed to a direction opposite to the first direction by fastening the second screw, and wherein the tilt of the intermediate unit to the fixing unit is changed to a second direction by fastening the third screw and is changed to a direction opposite to the second direction by fastening the fourth screw.

8. The lens barrel according to claim 1, wherein:

the first screw and the second screw are aligned in a direction orthogonal to the optical axis, and the third screw and the fourth screw area aligned in a direction orthogonal to the optical axis.

9. The lens barrel according to claim 1, wherein:

the first screw and the second screw are aligned in a direction orthogonal to the first straight line, and the third screw and the fourth screw area are aligned in a direction orthogonal to the second straight line.

10. The lens barrel according to claim 1, wherein:

the first screw and the second screw are arranged on a circumference with the optical axis as a center, and the third screw and the fourth screw are arranged on a circumference with the optical axis as a center.

11. The lens barrel according to claim 1, wherein:

the first screw, the second screw, and the first fixing member are arranged on a circumference with the optical axis as a center, and the third screw, the fourth screw, and the second fixing member are arranged on a circumference with the optical axis as a center.

* * * * *